Patented Aug. 12, 1952

2,606,903

UNITED STATES PATENT OFFICE 2,606,903

ASCORBIC ACID ADDITION COMPOUND OF SULFATHIAZOLE

Simon L. Ruskin, New York, N. Y., assignor, by mesne assignments, to Physiological Chemicals Company, New Rochelle, N. Y., a corporation of New York No Drawing. Application March 29, 1944, Serial No. 528,612

1 Claim. (Cl. 260—239.65)

The present invention relates to ascorbic or laevo-ascorbic (cevitamic) acid derivatives of organic amino compounds, both acid addition products and salts and mixed addition products and salts, and particularly of sulfanilic acid and of sulfanilamides, including sulfanilamide itself and its N'-derivatives, and also those derivatives wherein one or both of the hydrogens of the nuclearly bound amino group are replaced by an acyl or other group, including derivatives wherein the sulfonamide group is substituted by an alkylol group, the hydroxy group being free for reaction with the ascorbic acid to form an ester.

The present application is a continuation-in-part of my copending application Ser. No. 457,598, filed September 7, 1942, now Patent No. 2,419,230, which in turn is a continuation-in-part of my application, Ser. No. 192,789, filed February 26, 1938, which issued as Patent No. 2,294,937, on September 8, 1942.

It is the general object of the invention to improve the physiological and/or physical properties of organic amino compounds having therapeutic activity and having a basic group, such as $NH_2$ or alcoholic hydroxyl, by combining the same with ascorbic acid to form either a true salt or an addition compound, to effect a reduction in the toxicity, an improvement in the solubility, a diminishing of irritation on injection, etc.

The toxicity of sulfanilamide and its derivatives, including its N'-acyl derivatives, sulfapyridine, sulfathiazole, sulfathiodiazole, sulfadiazine, sulfamerazine, etc., is well known; in fact, many of the known derivatives have been produced in the attempt to reduce the toxicity of the parent sulfanilamide. It also has been found that where the treatment of, for example, open wounds required both a sulfanilamide drug and an anaesthetic, such as novocaine, the latter acts antagonistically toward the bactericide, thereby considerably reducing its effectiveness.

I have found that by combining various therapeutic agents containing an amino group with ascorbic acid, either to form a true salt (as by reaction with an alcohol group) or an addition compound, or both, products of improved properties are obtained. These improvements consist generally in a reduced toxicity, an increased solubility, the elimination or reduction of irritating action on the tissues, and in the case of anaesthetics, like novocaine, the suppression of the antagonism toward sulfanilamide drugs. My improved compounds are of particular value because they have associated or chemically incorporated therein a substance, namely, ascorbic acid, which is a normal component of the blood and of body tissues, so that the modification of the known therapeutic agents does not involve the introduction of still another radical foreign to the animal organism. The combination of the normally toxic sulfanilamides with ascorbic acid either in the form of acid addition products, or of esters by reaction with an alcohol hydroxyl group introduced into the sulfanilamide compound, as by substitution of N' with an alkylol group, or in both ways, thus involves a modification of the therapeutic agent which makes it more easily tolerated by the animal body.

The detoxicating action of ascorbic acid on the sulfanilamides is probably the result of the formation of a larger molecule with pronounced serum protein-combining power. This combining power with the serum protein permits a greater rate and degree of absorption of the therapeutic agent. Pick and his co-workers have shown that the toxicity of a substance introduced into the blood stream is inversely proportional to its ability to form serum protein complexes, and substances that do not form the serum protein complexes are toxic and are usually excreted in the uncombined form. This is one of the underlying difficulties with sulfonamide compounds, and in the process of excretion, they cause considerable kidney damage. The ascorbate radical both increases the utilization of the sulfonamide compound and acts as a protective mechanism in its excretion.

The following examples illustrate several methods of manufacturing the improved compounds in accordance with the invention:

Example 1.—Preparation of acetylsulfanilyl ascorbic acid 7 g. (4/100 mol) ascorbic acid were dissolved under cooling with ice in 25 cc. dry pyridine. The solution was then treated slowly under stirring and cooling with 10 g. (4/100 mol) of acetylamino benzene sulfochloride, care being taken to keep the reaction temperature at 50° C. The reaction mixture was then placed on ice over night. The following day it was treated with excess ether. A heavy oil precipitated which turned to an amorphous semi-solid on being further washed with ether. The last traces of pyridine were removed in a vacuum desiccator at room temperature. The product showed no tendency to crystallize. It was soluble in water and alcohol, and insoluble in chloroform, acetone, benzene and ethyl acetate. The product was taken up in 50 cc. absolute ether and treated under stirring with 2 equivalents of sodium ethoxide in 100 cc. absolute alcohol. The second equivalent of sodium ethoxide was added because of the pyridine hydrochloride present. An orange colored precipitate was obtained which became filterable on standing in the ice chest over night. Yield of sodium salt: 11 g.

*Example 2.—Preparation of sulfanilamide ascorbate*

17.2 g. (1/10 mol) sulfanilamide and 17.6 g. (1/10) ascorbic acid were well mixed and then 75 cc. dry methyl alcohol were added. On heating to the boiling point complete solution took place with the formation of a deep yellow color. The warm solution was then treated under stirring with 150 cc. chloroform. A crystalline precipitate formed which was filtered off after standing in the ice chest over night. Yield 33 g. or 95% theory.

To determine the amount of ascorbic acid present the salt was titrated with 0.1 N iodine solution.

Mg. ascorbic acid in 200 mg. salt:
105 mg. ascorbic acid found
101 mg. ascorbic acid theory

*Example 3.—Preparation of sulfanil-ethanolamide monoascorbate*

47 g. (1/5 mol) acetyl sulfanil chloride were slowly added under stirring to 24.5 g. (2/5 mol) ethanolamine dissolved in 100 cc. water, care being taken to keep the reaction temperature around 40° C. At the end of the reaction a thick paste was obtained which was allowed to stand on ice a few hours, and then filtered. Yield 51 g. or 98%. The crude product was dissolved in a mixture of 25 cc. water and 50 cc. 5 N sulfuric acid, and the resulting solution was then heated on a water bath for three hours. The darkened acid solution was then neutralized to a pH of about 10 with 30% sodium hydroxide and allowed to stand on ice over night. At this point a heavy oil was obtained which crystallized on standing in the ice chest over night. The following day the resulting sulfanil-ethanolamide was filtered off and washed with a little cold water. It was purified by recrystallizing twice from 10 cc. boiling water to which animal charcoal had been added. At the end of the second purification the product precipitated as crystals. Yield 17 g. or about 40% of theory.

Analysis:
N=12.61% found
12.96% theory

The reactions may be represented as follows:

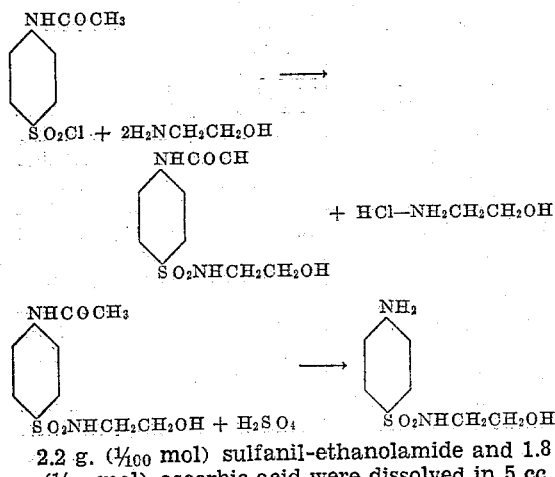

2.2 g. (1/100 mol) sulfanil-ethanolamide and 1.8 g. (1/100 mol) ascorbic acid were dissolved in 5 cc. dry methyl alcohol and boiled on a water bath until crystals began to show in the hot solution. The reaction mixture was then treated with 35 cc. chloroform and allowed to stand on ice over night. The following day pale yellow crystals of the mono-ascorbate were filtered off and washed with chloroform. Yield 3.8 g. or 95% theory.

To determine the amount of ascorbic acid present the salt was titrated with 0.1 N iodine solution.

Mg. ascorbic acid in 200 mg. salt:
92.4 mg. found
89.0 mg. theory

*Example 4.—Preparation of sulfanil-ethanolamide di-ascorbate*

2.2 g. (1/100 mol) sulfanil-ethanolamide and 3.6 g. (2/100 mol) ascorbic acid were dissolved in 10 cc. dry methyl alcohol and boiled (with cover) on a water bath until crystals began to show in the hot solution. The reaction solution was then treated with 50 cc. chloroform and allowed to stand on ice over night. The following day dark yellow crystals of the di-ascorbate were filtered off and washed with chloroform. Yield 5.2 g. or 90% theory.

To determine the amount of ascorbic acid present, the salt was titrated with 0.1 N iodine solution.

Mg. ascorbic acid in 200 mg. salt:
127.6 mg. found
124.4 mg. theory

The above product was also prepared in the following manner:

21.6 g. (1/10 mol) sulfanilyl ethanolamide were dissolved in about 250 cc. absolute methyl alcohol. To this solution were added 35.2 g. (2/10 mol) of ascorbic acid and the solution concentrated until a greenish yellow color was obtained. It was then treated with three volumes of chloroform and allowed to stand on ice over night. The following day the precipitate was filtered off and washed with a little chloroform. Yield 56 g. or practically quantitative. Titration with iodine showed the formation of a double ascorbate.

*Example 5.—Preparation of sulfathiazole ascorbate*

176 g. (1 mol) ascorbic acid and 223 g. (1 mol) sulfathiazole were dissolved in 3600 cc. 95% methyl alcohol and the solution refluxed for approximately fifteen minutes. The yellow solution was filtered by suction and concentrated to 1500 cc. at atmospheric pressure on the water bath. At this point a heavy precipitate began to form. The reaction mixture was then treated with 3000 cc. chloroform under stirring. A voluminous yellow precipitate was obtained. After standing in the ice chest over night it was filtered and washed with a little chloroform. It was then air dried to constant weight. Yield 365 grams or 91%.

Titration for ascorbic acid:
224 mg. ascorbic in 500 mg. salt found
220 mg. ascorbic in 500 mg. salt theory

*Example 6.—Preparation of sulfadiazine ascorbate*

5 g. (0.02 mol) sulfadiazine and 3.5 g. (0.02 mol) ascorbic acid were stirred in 100 cc. pyridine, and the pyridine distilled off at reduced pressure until a clear yellow solution was obtained. The distillation was then continued until crystallization began again. The reaction mixture at this point was approximately 20 cc. It was then treated under stirring with 100 cc. chloroform. After cooling in the ice chest a yellow precipitate was obtained. Yield 5.5 g. or 55%. Titration with iodine showed an excess of approximately 55% sulfadiazine.

The reaction may also be carried out by dissolving equimolecular quantities of sulfadiazine and ascorbic acid in a minimum amount of propylene glycol and then precipitating the resulting double salt with five volumes of chloroform.

Example 7.—Preparation of sulfamerazine ascorbate 5.3 g. (0.02 mol) sulfamerazine and 7.0 g. (0.04 mol) ascorbic acid were heated together in 25 cc. propylene glycol until solution was complete. This takes place at approximately 125° C., a deep orange solution being obtained. The reaction mixture was then cooled to room temperature and treated under stirring with 150 cc. chloroform. On cooling in the ice chest, crystallization took place. The yellow crystals were filtered by suction, washed with a small amount of chloroform and air dried. Yield 8.8 g. or theory for a mono ascorbate. Titration with iodine showed that one molecule of ascorbic acid had reacted with one molecule of sulfamerazine. Formula— $C_{11}H_{12}O_2N_4S \cdot C_6H_8O_6$.

The reaction may also be carried out by dissolving equimolecular quantities of sulfamerazine and ascorbic acid in a minimum amount of pyridine and precipitating with five volumes of chloroform.

Example 8.—Preparation of strychnine ascorbate 33.4 g. strychnine ($\frac{1}{10}$ mol) and 17.6 g. ($\frac{1}{10}$ mol) ascorbic acid were warmed with 250 cc. absolute methyl alcohol, and the resulting solution concentrated to about 150 cc. It was then treated with about 1000 cc. acetone which were slowly added under stirring and cooling. An amorphous precipitate was obtained which hardened on standing in the ice chest over night. Yield about 51 g. or nearly 100%. The product is light yellow and soluble in its own weight of water.

Example 9.—Novocaine ascorbate 23.6 g. ($\frac{1}{10}$ mole) novocaine and 17.6 g. ($\frac{1}{10}$ mol) ascorbic acid were warmed with about 200 cc. absolute methyl alcohol until solution was complete. The resulting solution was then slowly treated under stirring and cooling with 500 cc. chloroform or acetone. A yellow precipitate was obtained, which hardened on standing over night in the ice chest. Yield 40 g. or almost quantitative. The ascorbates of cocaine and atropine may be similarly prepared.

In certain of the above reactions, as in the reaction between sulfanilamide and ascorbic acid, a small proportion of zinc chloride may be employed as catalyst in the salt or ester formation.

That some sort of chemical combination takes place between the amino compounds above described and ascorbic acid is evident, for example, from the fact that in the case of sulfanilamide ascorbate, greater solubility in methyl alcohol is obtained than is possessed either by sulfanilamide or by ascorbic acid. As this product is the salt of a relatively weak acid and relatively weak base, it hydrolyzes to a large extent in water; nevertheless, the ascorbate appears to be less toxic in wound serum then sulfanilamide alone. In the form of the ascorbate, or in the presence of a substantially equivalent amount of ascorbic acid, the solubility of sulfanilamide in water is increased from about 0.8% to about 1.2%. This increase in solubility with simultaneous reduction in toxicity greatly enhances the therapeutic value of the sulfanilamide.

While in certain of the above examples I have described the use of $N^4$ acetyl derivatives, such acetylated compound was presented only by way of example; for other acyl groups may be substituted in the para-amino group, such as propionyl, valeryl, benzoyl, and the like. Where it is desired to form the ester of a sulfonalkylolamide compound with ascorbic acid while keeping the para-amino group unsubstituted, the corresponding para-nitro compound may be used as starting material and the para-nitro-benzene-sulfonalkylolamide ascorbate then converted to the corresponding para-amino compound by careful reduction, as by means of activated hydrogen in the manner well understood in the art.

In place of the ethanolamine, other alkylolamines may be used, such as propanolamine, butanolamine, as well as their isomers and the higher alkylolamines.

Heterocyclic compounds having a reactive amino group are also suitable for the production of valuable therapeutic compounds. For instance, one may employ the 2.6 diamino 2-ethyl pyridine, which possesses anaesthetic properties, and bring the same into reactive contact with ascorbic acid to cause the formation of an amino-ethyl-pyridine-amino-ascorbate having considerably improved properties. Other compounds of analogous character and having the pyridine or quinoline nucleus may be employed in this reaction.

Many di-azo compounds are known which have found application as valuable anti-bacterial agents and have aryl as well as heterocyclic groups may be combined in accordance with the present invention. As typical of such compounds one may take the 3.6 diamino 2-methyl 5-phenyl-azo pyradine and combine the same with ascorbic acid as above explained. Other compounds of the azo type having two heterocyclic radicals are also applicable to the present invention; for example, the 2.6 diamino 3-pyridylazo pyridine may be coupled with the ascorbic acid to give bactericidal compounds of improved value. Also available are similar compounds having substituent groups in place of one or more of the free hydrogens on the rings, such as halogen, hydroxy, alkoxy, alkyl, aryl, and the like.

From the above it will be seen that a very large variety of therapeutic compounds of diverse characters are suitable for combination with ascorbic acid, forming compounds of enhanced value. While the character of the compounds may vary widely, it is essential that there be present an amino group capable of combining with an acid group under the conditions stated above or under other conditions well known to the skilled chemist; or else, an alkylol group having a free hydroxyl capable of reacting with ascorbic acid.

The dosage of my improved compounds can be made the same as the corresponding known compounds; however, because of generally improved therapeutic ratio, somewhat lower dosages may be relied on. My improved products can be administered orally or parenterally, or applied to open wounds, just like the corresponding known compounds.

The ascorbic acid derivatives above described can be administered in the form of tablets, powders or solutions. The tablets can be of one-half and one gram size while aqueous solutions of one and one-half per cent strength can be prepared and marketed in 10 cc. ampules. The powder can be packaged in paper shaker containers of five gram contents for the insufflation of wounds. Especially in the open wound treatment the ascorbate derivatives of the sulfanilamides are of particular advantage because they tend to clot globulin and thereby prevent or reduce hemorrhage. The ascorbate radical also tends to make the sulfanilamide compound more effective since the latter tends to cake in the presence of blood serum; the ascorbates, however, being generally hygroscopic, form a loose mass.

In addition to the ascorbic acid compounds or ascorbic acid derivatives of organic amino compounds having physiological activity the corresponding derivatives of the ptomaines, putrescine, cadaverine and tyramine have been found by me to have valuable therapeutic properties. These toxic amines are detoxified in the form of their ascorbic acid compounds; thus the injection of cadaverine ascorbate and of the other ptomaine ascorbates, in small doses tends to immunize the patient against these toxic amino compounds. Such treatment is particularly useful in the case of ulcero-necrotic lesions due to Vincent's infections and in other conditions associated with cavitation. Valuable therapeutic agents are formed also by treating other alkaloids, like the cinchona alkaloids, including quinine and its derivatives, quinidine, cinchonine, etc. with ascorbic acid, to form the salts or esters. In each case improved solubility, reduced toxicity and/or better absorption or therapeutic efficiency is obtained. Among other organic amino compounds which, I have found, form valuable products with ascorbic acid, are the purine, and pyrimidine ascorbates such as theophyline ascorbate, theobromine and caffeine ascorbate, as well as the ascorbates of adenine, adenosine, guanine, guanosine, thymine, cytidine and uridine.

I claim:

The ascorbic acid addition compound of sulfathiazole.

SIMON L. RUSKIN.

REFERENCES CITED

The following references are of record in the file of this patent:

UNITED STATES PATENTS

| Number | Name | Date |
|---|---|---|
| 2,132,662 | Volwiler et al. | Oct. 11, 1938 |
| 2,134,246 | Elger | Oct. 25, 1938 |
| 2,140,989 | Eisenbrand et al. | Dec. 20, 1938 |
| 2,150,140 | Warnat | Mar. 7, 1939 |
| 2,283,817 | Martin et al. | May 19, 1942 |
| 2,294,937 | Ruskin | Sept. 8, 1942 |
| 2,419,230 | Ruskin | Apr. 22, 1947 |

OTHER REFERENCES

Journal Biological Chemistry, June 1941, vol. 139, pp. 871–875.

Science, vol. 86, pp. 228, 229 (1937).

Science Supplement, September 22, 1939, p. 7.

Rosenberg: Chem. and Physiology of Vitamines, Interscience Pub. Co., N. Y., 1942.

Chudbury: J. Indian Chem. Soc. 14, p. 733 (December 1937).

Cheronis: "Semimicro and Macro Organic Chemistry," p. 27, (Crowell Co., New York, 1942).